J. YENNETT AND E. T. LONKERT.
MACHINE FOR MAKING REEL FRAMES.
APPLICATION FILED JUNE 14, 1919.

1,341,964.

Patented June 1, 1920.
4 SHEETS—SHEET 1.

Inventors
John Yennett, and
Edward T. Lonkert,
Lacy & Lacy,
attorneys.

J. YENNETT AND E. T. LONKERT.
MACHINE FOR MAKING REEL FRAMES.
APPLICATION FILED JUNE 14, 1919.
1,341,964.
Patented June 1, 1920.
4 SHEETS—SHEET 2.
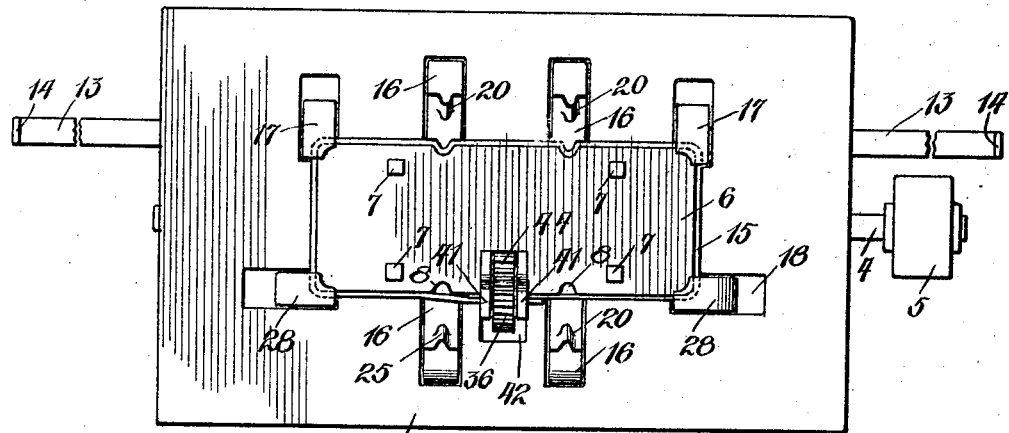
Fig. 3.
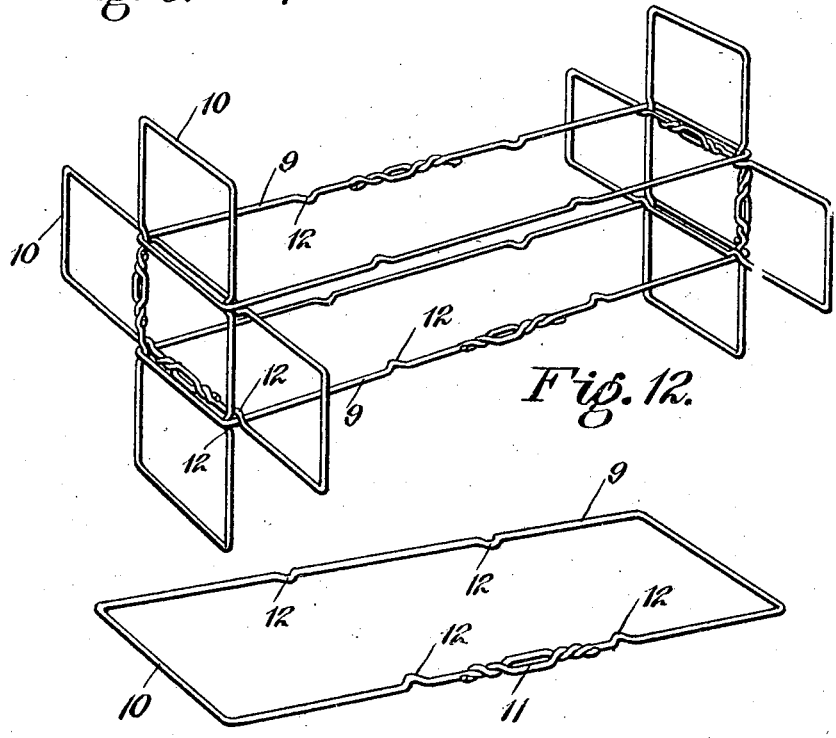
Fig. 12.
Fig. 13.
Inventors
John Yennett, and
Edward T. Lonkert.
By Lacey & Lacey,
Attorneys J. YENNETT AND E. T. LONKERT.
MACHINE FOR MAKING REEL FRAMES.
APPLICATION FILED JUNE 14, 1919.

1,341,964.

Patented June 1, 1920.
4 SHEETS—SHEET 3.

Inventors
John Yennett, and
Edward T. Lonkert.

By Lacey & Lacey,
Attorneys

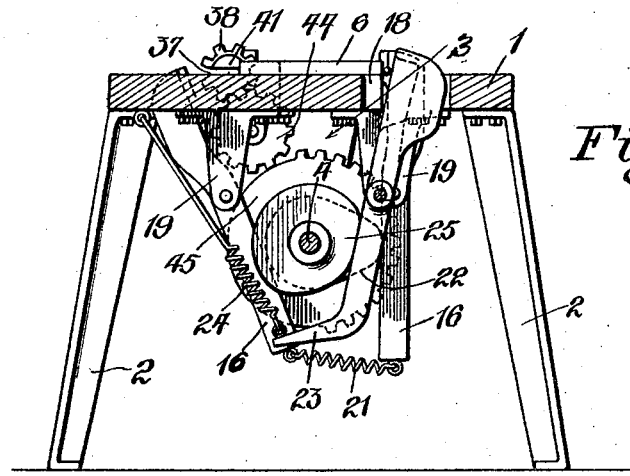
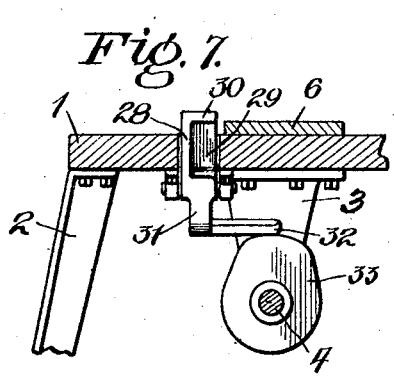
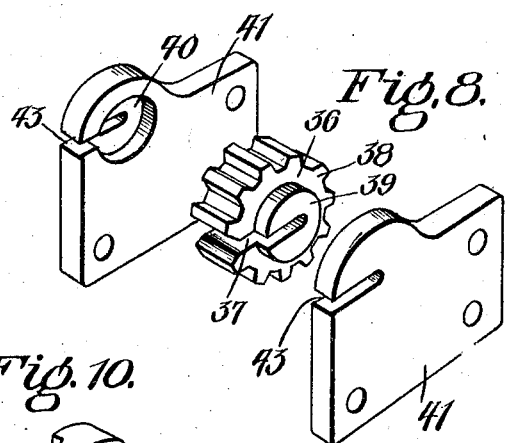
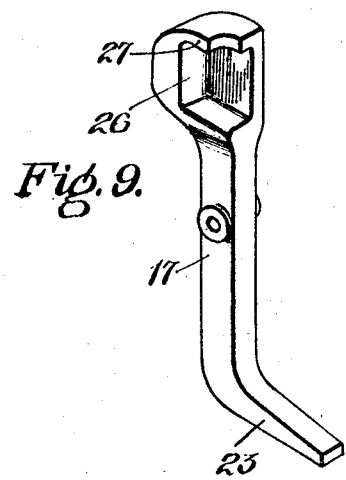
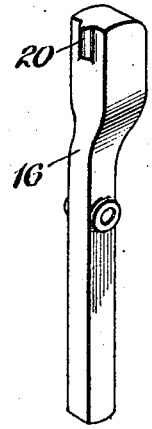

UNITED STATES PATENT OFFICE.

JOHN YENNETT AND EDWARD T. LONKERT, OF ATLANTA, GEORGIA.

MACHINE FOR MAKING REEL-FRAMES.

1,341,964. Specification of Letters Patent. Patented June 1, 1920.

Application filed June 14, 1919. Serial No. 304,315.

*To all whom it may concern:*

Be it known that we, JOHN YENNETT and EDWARD T. LONKERT, citizens of the United States, residing at Atlanta, in the county of Fulton and State of Georgia, have invented certain new and useful Improvements in Machines for Making Reel-Frames, of which the following is a specification.

Our invention relates to the manufacture of reels or spools upon which barb wire is wound for shipment and commercial use. The particular object of the invention is to provide automatic mechanism whereby the spool or reel frames may be rapidly and effectually produced and the invention resides in certain novel features of the mechanism employed and in the novel form of the reel produced by the use of the mechanism. The invention seeks to provide a machine in which a single length or strand of wire will be successfully engaged by operating instrumentalities and bent into the proper form and its ends joined together, the several frames to be subsequently assembled in a completed reel.

The invention is illustrated in the accompanying drawings, in which—

Fig. 3 is a similar view showing the wire in the position it occupies just prior to the final crimping and twisting;

Fig. 6 is a transverse section on the line 6—6 of Fig. 1;

Fig. 7 is an enlarged detail view of one of the folders by which the first corner bend is produced;

Fig. 8 is a detail perspective view of the twisting mechanism showing the parts thereof disassembled but in their proper relative positions;

Fig. 9 is a detail perspective view of one of the folders by which the second corner fold or bend is produced;

Fig. 10 is a detail perspective view of one of the crimpers;

Fig. 11 is an enlarged detail perspective view of the folder shown in Fig. 7;

Fig. 12 is a perspective view of the completed reel or spool;

Fig. 13 is a perspective view of one of the frames for the reel or spool.

Figure 1:
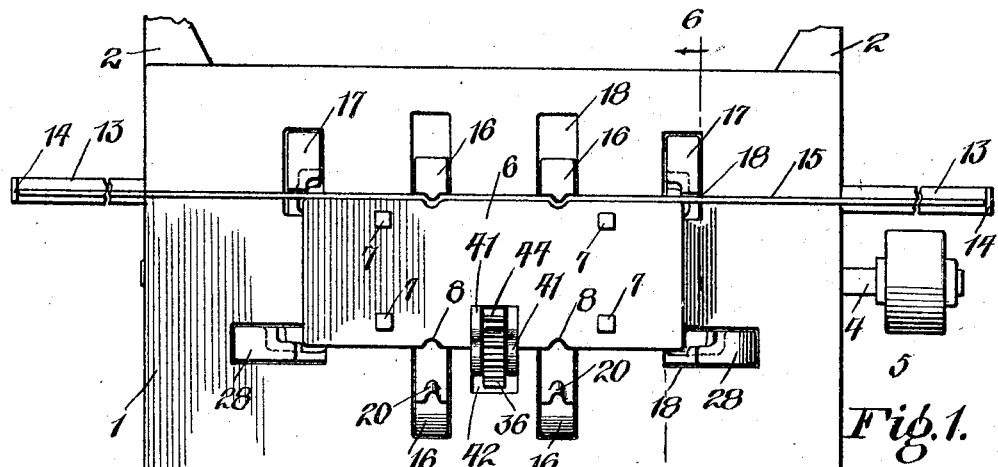
Figure 1 is a plan view of a machine embodying out improvements, the strand of wire being shown in position and with the initial crimp formed therein.

In carrying out our invention, we employ a table 1 which may be of any desired material and of any convenient dimensions. This table is supported upon legs or standards 2 which are firmly secured to the floor of the workroom so that the machine will effectually resist vibration. Supported in suitable bearing brackets 3 which are secured to and depend from the table at or near the ends thereof is a driving shaft 4 which is equipped at one end with a band pulley 5 adapted to receive power from any suitable motor. Upon this driving shaft 4 are secured a plurality of cams and a mutilated gear which will be presently specifically mentioned. At the center of the table, on the upper side thereof, we form or secure a form block 6 which is preferably removable and is secured to the table by bolts or screws 7, the heads of which are preferably flush with the surface of the form block. This block is provided with rounded corners and in its longitudinal edges are recesses or notches 8 which are disposed at opposite sides of the center of the block and into which the strand of wire is forced by crimpers in order to produce bends or kinks therein.

As shown most clearly in Fig. 12, the reel is composed of six oblong wire frames which are identical in construction, although the frames 9, which extend longitudinally of the reel and form the center thereof, are somewhat longer than the frames 10 which form the ends of the reel. The form block 6 is, therefore, preferably removable so that blocks of the proper dimensions to form the frames of the different lengths may be interchangeably used but, of course, it may be sometimes more desirable to employ two machines having form blocks of different sizes and in which the form blocks will be integral with or otherwise permanently provided upon the table. As shown in Fig. 13, the wire is bent to provide an oblong structure and its ends are twisted together, as at 11, so that they will be firmly joined and cannot be accidentally or easily separated. The frame will thus retain its identity and will effectually support the spool of wire. In the longitudinal sides of the frame, the kinks or bends 12 are formed and when the frames are assembled by disposing two of them at right angles to each other, as shown in Fig. 12, the kinks or bends will intersect or be adjacent each other, as shown in Fig. 12. By placing two frames 10 together at right angles, as shown in Fig. 12, and as just mentioned, the ends of the reel are produced and the body, center, or core of the reel is produced by engaging the ends of the longer frames 9 over the ends of one shorter frame 10 and sliding the said end frames 10 to the ends of the longer frame. The kinks of the end frames will then engage the sides of the longer frame so that relative movement and dislocation of the several frames will be avoided. Of course, if desired, tie wires may be wrapped around the junctions of the several frames, but in ordinary usage such tie wires will not be needed and they are, therefore, not illustrated.

To the ends of the table 1, we secure laterally projecting gage arms 13, the ends of which are turned up to form stops 14 and when a reel frame is to be formed the strand of wire, indicated at 15, is placed upon the table so that its ends will rest upon the gages 13 and abut the stops 14. In this position the wire will lie upon the table against one side edge of the frame block and between the crimpers 16 and the folders 17. The several crimpers and folders project through slots or openings 18 in the table and are pivotally supported between brackets or arms 19 secured to and depending from the under side of the table. The crimpers are provided at their upper ends on their opposed faces with teeth 20 which are of proper form to mate with and take into the notches 8 in the form block. The crimpers are disposed in pairs, as shown, and the lower ends of the members of each pair are connected with coil springs 21. Between the members of each pair of crimpers, a cam 22 is secured upon the driving shaft and it will be readily understood that when the high part of the cam is bearing against a crimper the lower part of the said crimper will be swung outwardly with respect to the form block and the upper end thereof swung toward the form block so that the teeth 20 will bear upon the strand of wire and force the same into the adjacent notch 8 of the form block and thereby produce the kink or bend 12 therein. This action of the crimpers at one side of the form block occurs just prior to the action of the folders 17 at the same side of the form block. The spring 21 connecting the crimpers of each pair serves to hold both crimpers in constant engagement with the operating cam and, consequently, as the high part of the cam bears upon one crimper the diametrically opposite low part of the cam will bear against the opposed crimper and the said opposed crimper will be swung away from the form block, as shown most clearly in Figs. 1 and 6. The cams for the two pairs of crimpers are duplicates and the crimpers at each side of the form block operate in unison. The driving shaft with all the actuating members thereon is located below the pivots or fulcrums of the several crimpers and formers, as shown in Fig. 6.

Figure 2:
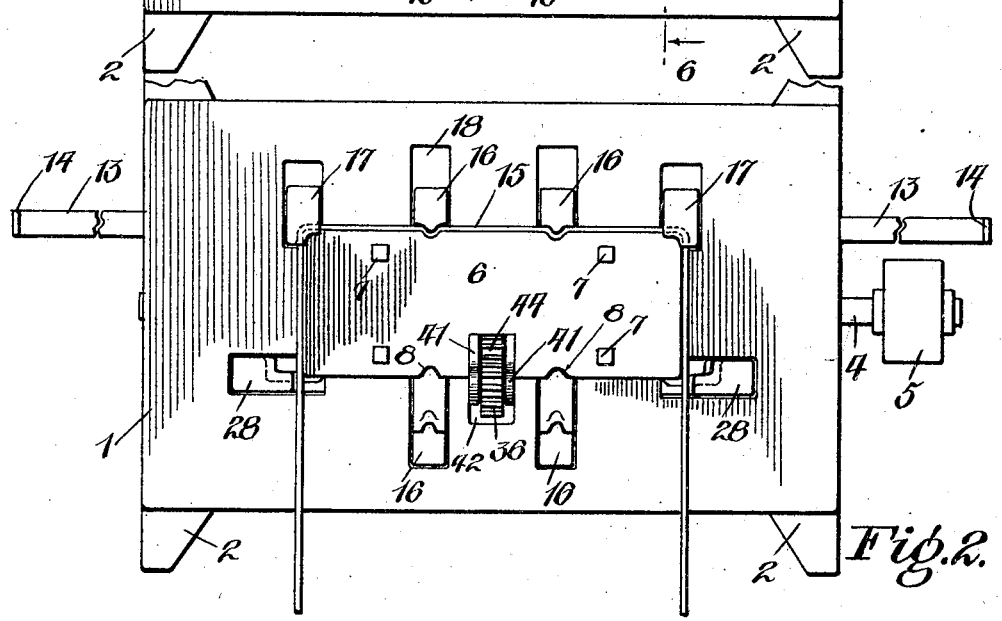
Fig. 2 is a similar view showing the shape assumed by the wire after the second step of the operation has been performed.
Figure 4:
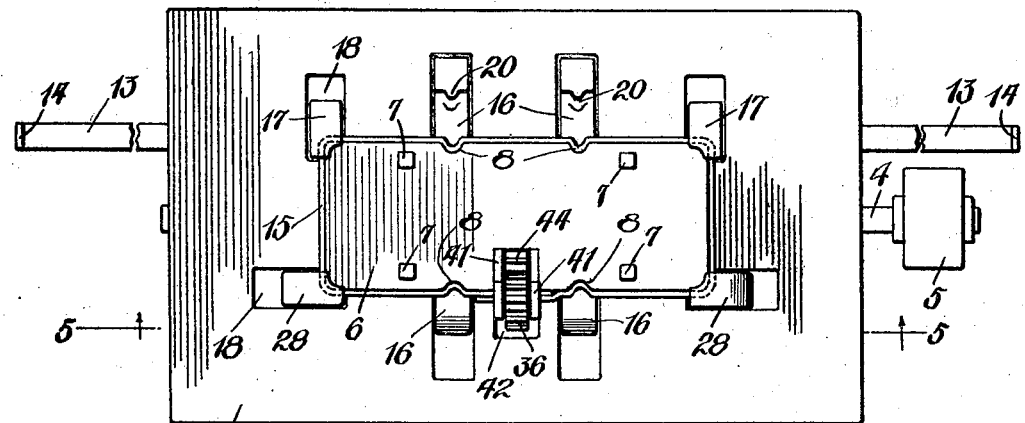
Fig. 4 is a similar view showing the ends of the wire in position in the twisting device and the final crimpers applied.
Figure 5:
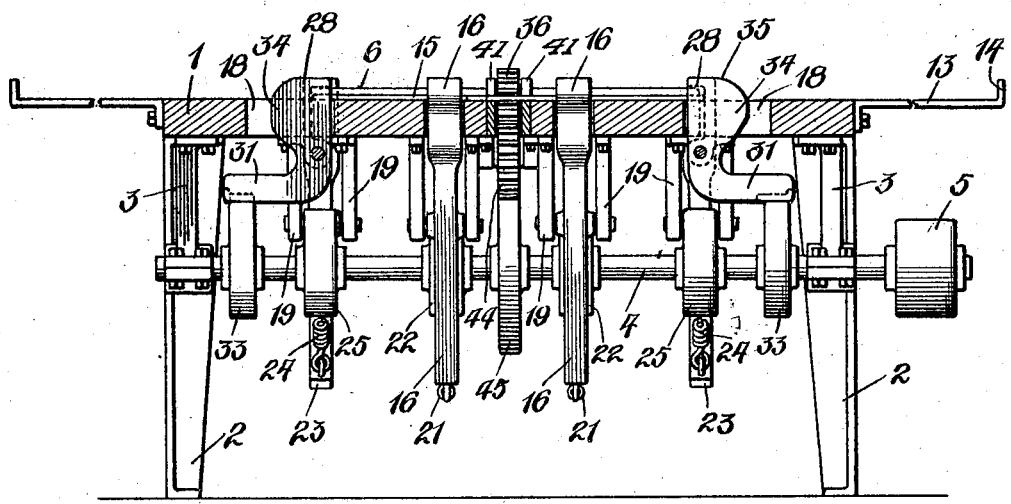
Fig. 5 is a longitudinal section through the machine.

The folders 17 for making the first folds or corner bends in the wire are mounted at the same side of the form block as the crimpers making the first kinks in the wire, as will be understood, and these folders have their lower ends turned laterally, as shown at 23, to project under the driving shaft and across the vertical plane of the same. A spring 24 attached to the extremity of the laterally turned foot 23 and to the under side of the table 1, serves to hold the folder constantly against the cam 25, which drives the same, with the upper end or working member of the folder normally away from the coacting corner of the form block. In the upper end of the folder, we provide a chamber or recess 26 which is adapted to fit over the corner of the form block and is constructed with an overhanging lip 27 which is adapted to project over the corner of the form block, as shown in Fig. 2, the result being that as the working end of the folder is swung against the strand of wire the free portion of the strand will be bent around the corner of the block and will be held to the block by the overhanging lip, the intermediate portion of the strand being held against movement by the crimpers 16 which have just been operated to form kinks therein. This position of the parts is clearly shown in Fig. 2 of the drawings. The crimpers for forming the initial kinks and the folders for producing the initial corner bends move transversely of the table and the operation of the parts is so timed that the folders begin to act upon the wire immediately after the crimpers have engaged the same so that the wire is very quickly brought into the form illustrated in Fig. 2. Adjacent the corners of the form block, opposite those to which the wire is bent by the folders 17 we provide the second folders 28 which have their upper ends provided with chambers 29 and overhanging lips 30 corresponding in form and function to the chambers 26 and lips 27 of the folders 17. The folders, 28, however, are mounted to swing longitudinally of the table and to effect this result their lower portions are bent at a right angle to the upper portion, as shown at 31, so as to extend longitudinally of the table toward the adjacent end thereof. At the end of the foot 31 is a laterally projecting presser plate 32 which extends at a right angle from the foot 31 toward the central longitudinal plane of the table and rests upon an operating cam 33. The weight of the folder will serve to maintain a constant engagement between the presser plate 32 and the cam 33 and in order to assure such constant engagement, the upper portion of the folder is carried outwardly beyond the vertical plane of the fulcrum of the folder, as shown at 34, whereby to produce a preponderance of weight at one side of the fulcrum which will tend to hold the folder toward the cam and normally away from the form block. The upper surface of the folder, as shown at 35, is beveled so that when the wire is moved transversely across the table by the action of the folders 17 it will ride readily over the upper end of the folders 28 and drop into position between said folders and the form block, as shown in Fig. 2. As soon as the wire has been brought into the last described position, the folders 28 will swing toward the form block and will engage the wire and fold the free ends thereof against the side of the form block, as shown in Fig. 3, the ends of the wire overlapping and passing into the twisting device. The upper ends of the crimpers are beveled, as clearly shown, so that the free ends of the wire will readily ride over the same and the normal position of the twisting device is such that the wire-receiving notch or groove therein will normally lie in the horizontal plane of the surface of the table so that when the wire passes over the crimpers the ends thereof will enter the said slot or notch in position to be wrapped about each other by the twister. As soon as the first corner bends have been made in the wire, the first acting crimpers will begin to move away from the wire and the crimpers second to act will, of course, simultaneously begin to move toward the form block but this action is so gradual that the wire will be acted upon by the second folders before the crimpers are in position to engage the wire. As soon, however, as the second corner bends have been made in the wire, the second crimpers will engage the same and produce the second kinks therein and they will remain in engagement with the wire until the twister begins to act.

The twister consists of a pinion or spur gear 36 having a radial slot 37 extending from its center to its periphery and opening between two of the teeth or spurs 38 thereon. At its ends, the twister is provided with bosses or trunnions 39 which rotatably seat in and engage the recesses or bearings 40 formed in the brackets or cheek plates 41 which are secured in the transverse slot 42 of the table at opposite sides of the said slot and are also provided with notches 43 through which the wire may pass to enter the groove or slot 37 of the twister which registers with the slots 43 when the twister is at rest. The twister is in mesh with a spur gear 44 mounted in suitable bearings on the under side of the table and extending into the slot 42 in the table. This gear 44 is actuated by a mutilated gear 45 which is secured upon the driving shaft and the parts are so timed and proportioned that the smooth portion of the mutilated gear will be presented to the gear 44, while the wire is being bent, but immediately upon the ends of the wire entering the slot 37 of the twister the toothed portion of the mutilated gear will mesh with the gear 44 and will actuate the same so that two complete revolutions of the twister will occur and the twister will then come to rest with the slot 37 in a horizontal position and extending toward the edge of the table and away from the form block, as shown in Fig. 6. During this action of the twister, the folders and crimpers will return to their initial positions and the finished frame may be removed and a new strand of wire placed upon the table and the gages 13, whereupon the operation will be repeated.

From the foregoing description, taken in connection with the accompanying drawings, it will be seen that we have provided a very compact and substantial machine whereby the frames from which barb wire spools are produced may be rapidly manufactured and all the frames produced in one machine will be of the same shape and dimensions. The only labor needed is that required to remove the formed frame and insert a strand of wire in position to be bent. The several folders and crimpers are disposed within the outline of the table and the greater portions of these parts together with all the driving members are disposed below the table so that they will not interfere in any way with the movements required to take a formed frame from the table and place a strand of wire thereon. Each member acting upon the wire will remain in engagement therewith until the succeeding member engages the wire so that at no time will the wire be free to slip from the form block and this result will be attained without any particular attention on the part of the operator. Workmen standing or passing near the machine are not apt to be injured by the working parts inasmuch as said parts are all below the table and within the vertical planes of the outline thereof and, therefore, are not liable to be struck by a workman, while at the same time they are readily accessible when any repairs or cleaning may be needed. The several parts are simple in their construction and the operation is not complicated so that the machine is not apt to get out of order and will be found very durable.

Having thus described the invention, what is claimed as new is:

1. The combination of a supporting table, a form block thereon, means for crimping a wire placed upon the table, means for subsequently bending the crimped wire about the form block to bring the ends of the wire together, and means for then crimping the bent wire adjacent its ends.

2. The combination with a supporting table, means for bending a wire placed thereon into substantially rectangular form, means for crimping the wire, and means for uniting the ends of the same.

3. The combination of a supporting table, means for bending into substantially rectangular form a wire placed upon the table, means for twisting the ends of the wire about each other, and means for crimping the intermediate portions of the wire.

4. The combination of a supporting table having a form block thereon, crimpers disposed at opposite sides of and coacting with the form block, folders arranged to coact with the corners of the form block and bend a wire around the same, and a twister disposed adjacent some of the crimpers and adapted to secure the ends of the wire together.

5. The combination of a supporting table having a form block thereon, opposed pairs of crimpers arranged at opposite sides of the form block and coacting therewith, means adjacent the corners of the form block to bend a wire about the same, and a twister disposed between the crimpers of one pair of crimpers to join the ends of the wire.

6. The combination of a form block having spaced notches in its opposed side edges, crimpers disposed adjacent the form block to force a wire into said notches, folders disposed adjacent the form block to bend the wire against the same, and means for uniting the ends of the wire.

7. The combination of a supporting table, a form block thereon, opposed crimpers pivotally mounted upon the table and disposed at opposite sides of the form block to coöperate therewith, a driving cam disposed between the lower portions of the opposed crimpers, and a yieldable connection between the lower extremities of the opposed crimpers whereby to maintain constant engagement between both said crimpers and the cam.

8. The combination of a supporting table, a form block thereon, folders pivotally mounted below the table and projecting through same to coöperate with the form block, said folders being arranged to move in intersecting planes whereby to bend a strand of wire around the corners of the form block successively, cams bearing upon the lower portions of the folders, and means for maintaining constant engagement between the folders and the cams.

9. The combination of a supporting table, a form block thereon, means for holding a wire to be bent against the form block, folders arranged adjacent the corners of the form block and provided in their upper portions with chambers to fit around the corners of the form block and with overhanging lips to project over the form block, and means for operating said folders successively.

In testimony whereof we affix our signatures.

JOHN YENNETT.
EDWARD T. LONKERT.